F. PAULSEN.
APPARATUS FOR MOLDING TIRES.
APPLICATION FILED APR. 11, 1917.
1,262,695.
Patented Apr. 16, 1918.
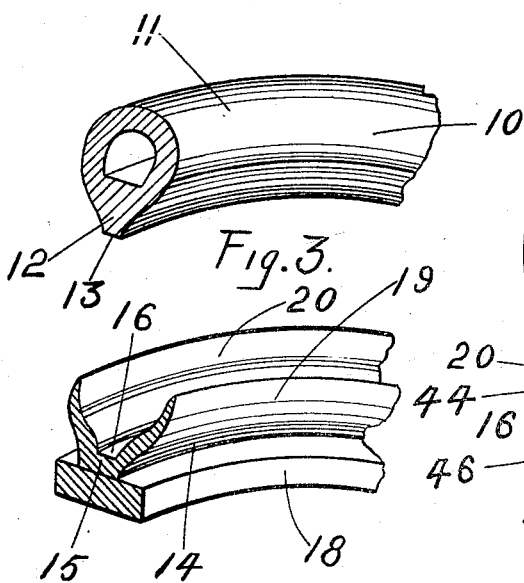
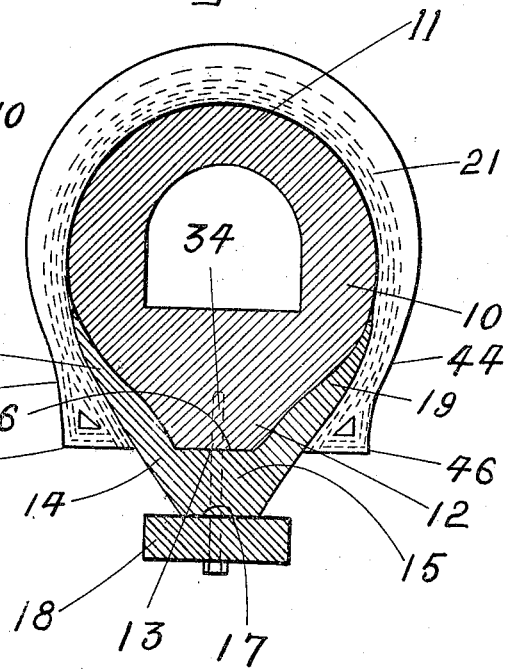
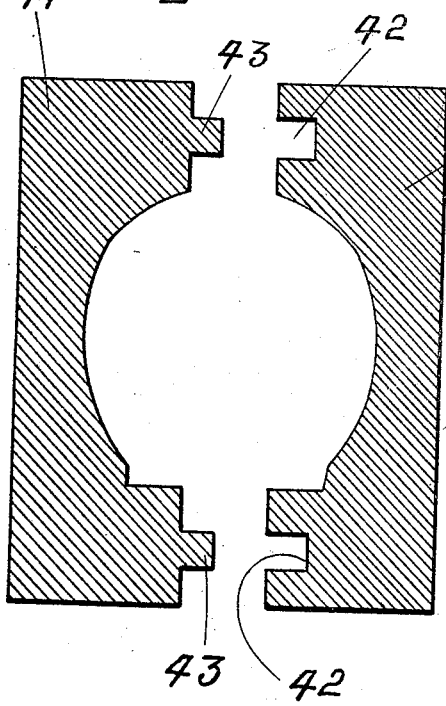
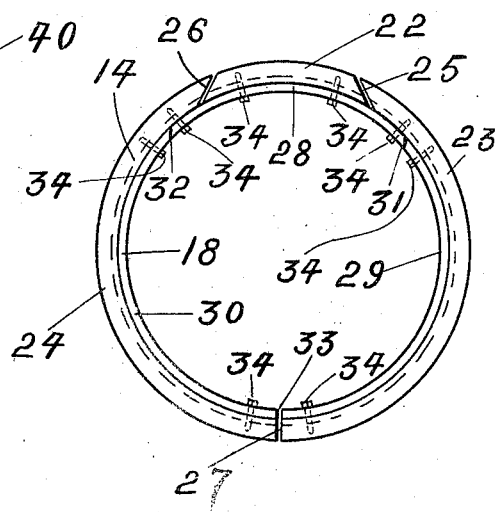
Inventor
Fred. Paulsen
per
Attorney

UNITED STATES PATENT OFFICE.

FREDERICK PAULSEN, OF MINNEAPOLIS, MINNESOTA.

APPARATUS FOR MOLDING TIRES.

1,262,695.

Specification of Letters Patent. Patented Apr. 16, 1918.

Application filed April 11, 1917. Serial No. 161,167.

*To all whom it may concern:*

Be it known that I, FREDERICK PAULSEN, a citizen of the United States, residing at Minneapolis, in the county of Hennepin and State of Minnesota, have invented certain new and useful Improvements in Apparatus for Molding Tires, of which the following is a specification.

My invention relates to an apparatus for molding tires and has for its object to provide in combination with the usual core form or mold for the tire a supplemental extension member applied to the inner rim of said mold and made sectional so that after the tire has been laid upon the combined mold formed by the mold proper and the supplemental section, and said supplemental section has been withdrawn (made possible by its sectional characteristics) and the tire so laid is subjected to outside pressure from the outer mold, the fabric of the tire will be uniformly stretched over the top and sides, due to the fact that the lower portions of the tire as laid will be spaced from the core and are forced inwardly by the clamping mold. It is a primary feature of my invention that the pressure exerted upon the tire outside of the core shall be a continuing pressure, for which reason the sectional clamping mold is made in two sections held together in dove-tailing relation by an annular flange, so that the sections do not completely engage at any time during the curing process, the body of the tire thus being at all times subjected to all of the pressure exerted upon the sections.

The full objects and advantages of my invention will appear in connection with the detailed description thereof and are particularly pointed out in the claims.

In the drawings, illustrating the application of my invention in one form,—

Figure 1 is a cross sectional view of a tire mold core with my improvements attached and the tire in position. Fig. 2 is a perspective sectional view of a part of the core alone. Fig. 3 is a similar view of the extension member. Fig. 4 is a plan view of the entire supplemental ring. Fig. 5 illustrates a transverse section of a clamping mold adapted to be applied to the tire after the supplemental form ring has been withdrawn.

As illustrated, the core 10 is of usual construction corresponding in shape to the inside of a finished tire casing and therefore having a portion 11 substantially circular in cross-section and an inner portion 12 which is drawn inwardly and downwardly to provide walls against which the lower walls of the tire casing may be caused to impinge by the clamp, said portion 12 having an annular base 13 for engagement with the base of the clamping device.

A supplemental core member 14 is provided having a base portion 15 with an outer annular wall 16 adapted to engage the wall 13 of core 10 and an inner annular wall 17 which receives a sectional ring 18 by which the supplemental member is secured in position upon the core 10. From the base portion 15 wings 19 and 20 extend outwardly, being formed to receive portion 12 of the core 10 and in combination therewith to provide an expanded core of outer contours such as indicated in Fig. 1 upon which the tire 21 is laid in a well-known way. As best shown in Fig. 4, the supplemental core piece 14 is divided into three sections 22, 23 and 24. Section 22 is supported from sections 23 and 24 by oblique clefts 25 and 26, while sections 23 and 24 are separated from one another by a radial cleft 27. The ring 18 is also divided into three sections 28, 29 and 30. The section 28 overlaps the clefts 25 and 26 and is separated from sections 29 and 30 by oblique clefts 31 and 32. Sections 29 and 30 in turn are separated by a radial cleft 33 which is in alinement with cleft 27. The ring sections are secured to the supplemental core sections by screw bolts 34 extending through ring 18 and threading into the base 15 of supplemental core piece 14.

In assembling the supplemental core piece upon the core 10 the sections 23 and 24, with their attached ring sections 29 and 30, are first put into position upon the core. The section 22 with its attached section 28 is then applied between the obliquely-cleft ends of sections 23, 24, 29 and 30 and the bolts 34 are screwed into position, which secures the supplemental core piece upon core 10 so as to make a substantially integral extension thereof.

After the tire 21 is laid upon the combination core form thus constructed the core extension 14 is removed and a mold such as shown in Fig. 5 is applied thereto. This comprises two rings 40 and 41 of cross-section such as shown in Fig. 5, ring 40 being provided with an annular groove 42 adapted to receive an annular tongue 43 on ring 40 by which the two rings are held in conforming relation as pressure is applied by hydraulic pressure. The tongue and groove 43 and 42, respectively, are of such cross-sectional length that the maximum requisite pressure will be applied to the tire before the walls of the rings 40 and 41 come into contact, thus insuring that there shall be continuous pressure applied to the tire casing apart from the reaction due to its resiliency during the entire curing process.

Under these circumstances the operation of my construction results in the following advantageous results. When the core extension 14 has been removed, the lower portions 44 of the tire will be spaced from the core 10. Upon application of pressure to the mold 40, 41 the lower sides 44 will be drawn inwardly. But the beads 46 engage the molding grooves in the clamp members and prevent relative movement thereof, thus causing the tire to be stretched circumferentially along the top and sides thereof. Furthermore, because of the fact that the clamping mold never comes into fixed position and the pressure applied thereto is, therefore, continuously applied to the tire throughout the curing process, this stretching and the pressure upon the tire is maintained uniform throughout the curing process and is not subject to change because of the changed condition of the tire substance itself, due to curing. This results in very much more perfect stretching and laying of the fabric and curing and setting of the rubber upon the same than is possible without the employment of my process and apparatus.

I claim:

1. An apparatus for molding tires comprising an annular core mold and a supplemental attachment thereto consisting of a sectional body having wings for receiving and spreading the inner portions of the side walls of the tire as it is laid upon the combined mold, and having a sectional ring secured to the supplemental core member for holding the sections in position upon the core mold while the tire is being laid and for permitting ready removal of the core mold sections after the laying of the tire is completed.

2. An apparatus for molding tires comprising an annular core mold and a supplemental attachment thereto consisting of a sectional body having wings for receiving and spreading the inner portions of the side walls of the tire as it is laid upon the combined mold, and having a sectional ring the sections of which are secured to the sections of the sectional body and one of the ring sections having its ends extending beyond the ends of the adjacent body section.

In testimony whereof I affix my signature.

FRED. PAULSEN.